Figure 1:
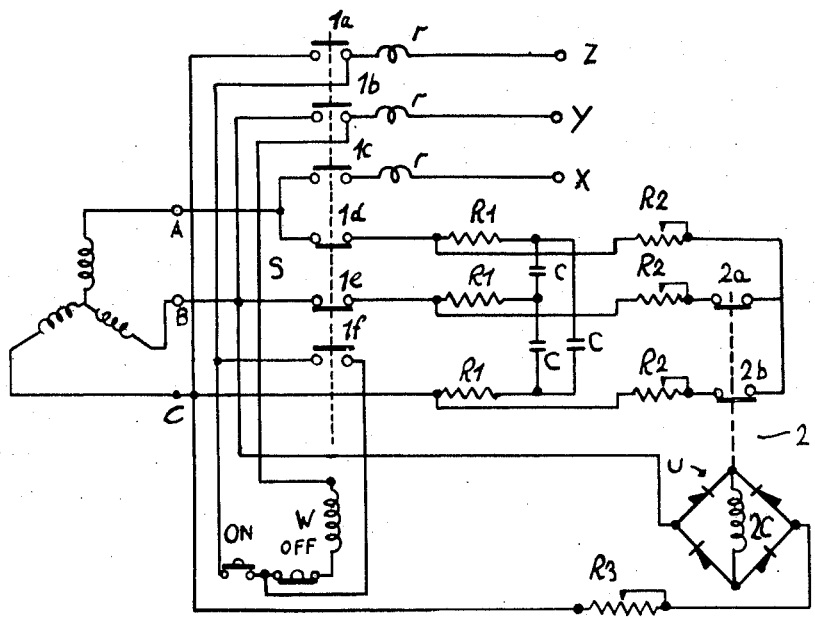

Oct. 13, 1964    SHAFI-UDDIN A. CHOUDHURY    3,153,182
DYNAMIC BRAKING OF A.C. MOTORS
Filed Sept. 1, 1961    2 Sheets-Sheet 1

INVENTOR
SHAFI-UDDIN AHMED CHOUDHURY
ATTORNEY

Oct. 13, 1964  SHAFI-UDDIN A. CHOUDHURY  3,153,182
DYNAMIC BRAKING OF A.C. MOTORS
Filed Sept. 1, 1961  2 Sheets-Sheet 2
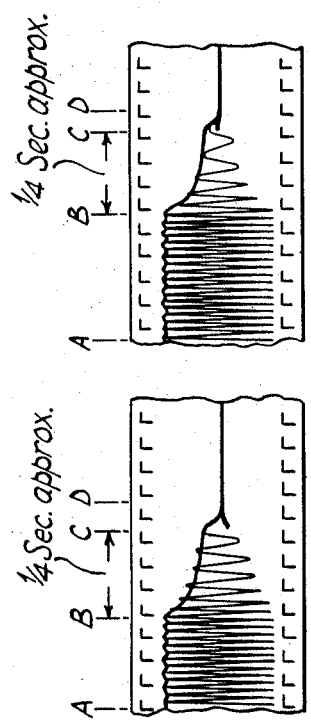
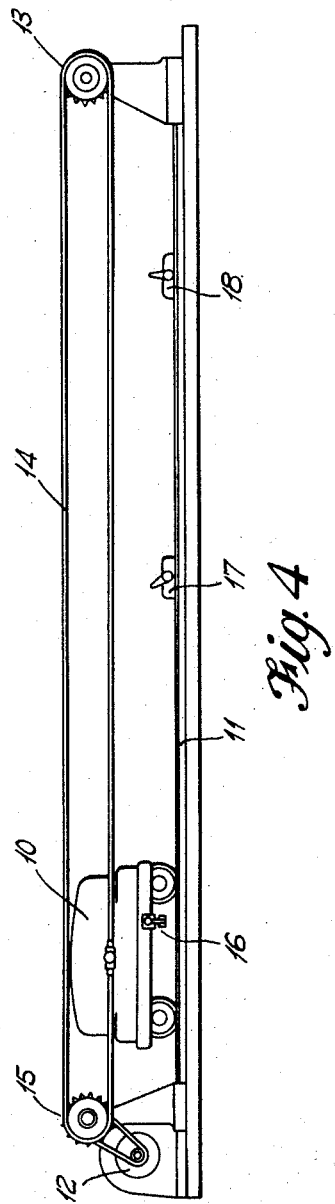
INVENTOR
SHAFI-UDDIN AHMED CHOUDHURY
ATTORNEY

United States Patent Office 3,153,182
Patented Oct. 13, 1964

3,153,182
DYNAMIC BRAKING OF A.C. MOTORS
Shafi-Uddin Ahmed Choudhury, Rugby, England, assignor to Associated Electrical Industries Limited, London, England, a British company
Filed Sept. 1, 1961, Ser. No. 135,492
Claims priority, application Great Britain, Sept. 20, 1960, 32,293/60
4 Claims. (Cl. 318—211)

This invention relates to the dynamic braking of a polyphase A.C. motor.

In the specification accompanying United States Patent No. 2,929,977, it was disclosed that the braking of an induction motor could be effected, after the supply had been disconnected from the primary winding, by connecting at least one capacitor across the terminals of the primary winding so that the motor self-excites and, after a delay enabling the speed to be reduced, introducing direct current excitation in order to bring the motor to rest. The introduction of the D.C. excitation involved the use of a transformer and a rectifier for rectifying the alternating supply voltage.

The present invention provides a similar braking characteristic without introducing D.C. current, thus saving the cost of a transformer and rectifier.

According to the invention, a dynamic braking arrangement for an A.C. motor comprises switching means for connecting capacitors across the terminals of the primary winding of the motor after the supply has been disconnected therefrom, and further switching means for connecting, after a predetermined delay, braking resistance of low value down to zero across the terminals of said primary winding.

Preferably, the number of capacitors employed is the same as the number of phases, with one capacitor connected across each phase.

It is advantageous, except on very small machines to connect resistors in series with each capacitor, and these are preferably variable so that adjustments can be made to the braking characteristic.

Similarly, in all but very small machines, it is necessary for the braking resistors subsequently connected across the terminals to have a real value, and these resistors are also preferably made variable.

In the preferred arrangement the braking resistors are connected across the terminals when the voltage generated by the self-excited motor falls to a predetermined level, and for this purpose a voltage-sensitive relay is employed. Although such a relay may employ rectifiers, such rectifiers need only be of instrument type and their cost is not to be compared with the cost of the power rectifier needed in the arrangement disclosed in the above-mentioned specification. It is convenient to connect a variable resistor in series with the relay so that yet another means of adjusting the braking characteristic is available.

When braking is initiated, the capacitors cause self-excitation of the motor, and the kinetic energy in the rotor and its load is converted to electrical energy which is dissipated in the machine resistance and any resistors connected in series with the capacitors. When the generated voltage falls to the level at which the relay operates to connect braking resistors across the terminals of the machine, the magnetic field is thereby caused to collapse and the energy thus released is utilized to bring the motor to standstill. There is also a momentary increase in the machine current and the corresponding increased copper losses also help to brake the motor. It will be realized that only a small amount of kinetic energy is left in the rotor at the time that the braking resistors are switched in, since it is arranged for this operation to be performed when the speed has been reduced to about one fifth to one tenth of its normal speed, the kinetic energy then being only one twenty-fifth to one hundredth of its initial value.

An embodiment of the invention applied to a three-phase motor is shown in FIG. 1 of the accompanying drawings, FIGS. 2 and 3 are typical oscillographs showing the operation of the invention, and FIG. 4 shows in diagrammatic form an application of the invention.

A main three-phase supply is indicated in FIG. 1 as connected to terminals X, Y, Z, their corresponding terminals of the primary winding of the motor being indicated at A, B, C. A contactor S, for controlling the connections of the supply to the primary winding of the motor has a plurality of contacts $1a$–$1f$, connected for simultaneous operation under the control of an operating coil W. Push-button type "ON" and "OFF" switches are indicated for the purpose of effecting control of the motor by way of the contactor S. A voltage sensitive relay 2 having contacts $2a$ and $2b$ and an operating coil $2c$ is provided for the purpose of switching on the braking resistor $R_2$ when the self-excitation voltage of the motor has diminished to a predetermined value, as hereinafter described. Resistor $R_1$ in series with capacitors $c$ control the value of the self-excitation voltage developed in the primary winding of the motor when, subsequent to disconnection of the supply from the primary windings, the capacitors $c$ are connected across these windings by contactor S.

When the main contactor S is in the "run" position, determined by closure of the "ON" push-button, the contacts $1a$, $1b$, $1c$ and $1f$ are closed and the contacts $1d$ and $1e$ are open. It will be seen that the operating coil $2c$ of the voltage sensitive relay 2 is energized through rectifier U to open contacts $2a$ and $2b$. Closure of the contactors is maintained by energization of its coil W through contacts $1f$ and "OFF" push-button.

When the contactor S is in the "brake" position, produced by opening contactor S by operation of the "OFF" push button, the supply is disconnected by the opening of contacts $1a$, $1b$ and $1c$, and the capacitors $c$ in series with the resistors $R_1$ are connected across the terminals of the motor. Dynamic braking then occurs due to self-excitation of the motor, and the voltage generated by the motor falls with the speed. At a predetermined voltage value the relay 2 drops out, allowing contacts $2a$ and $2b$ to close, thereby connecting resistors $R_2$ across the terminals. This action brings the motor quickly to rest.

By making $R_1$ and $R_2$ variable the deceleration before and after the operation of the relay can be modified. The introduction of a variable resistance $R_3$ in series with the relay coil also allows adjustment of the time during the deceleration period at which the type of braking is changed.

In an alternative arrangement the relay 2 could be controlled by a time-delay device to operate at a predetermined time after the main contactor S has been actuated to initiate dynamic braking.

When the capacitors are initially connected across the primary winding of the motor, the frequency is that of the supply. The effect of the capacitor is to produce, by self-excitation, a lower frequency which effects saturation of the magnetic circuit in which the primary winding is wound. This produces a high flux in the machine which is substantially maintained down to a low motor speed. Whilst the high flux density is still maintained a substantial short-circuit is produced in the winding which causes sudden collapse of the magnetic field. The work done by the collapse of the magnetic field exerts a braking effect on the rotor which brings the latter to rest.

The work done is proportional to current and rate of change of flux, and since the rate of change of flux is very high, the work done is correspondingly large, effecting the rapid reduction in speed of the rotor.

FIGS. 2 and 3 show oscillographs of tests carried out on a 3 H.P., 4 pole motor on a 400 v. 3 pH 50 c./s. supply. The oscillograph of FIG. 2 shows the results when the capacitance of the capacitors C is 100 μf., and in FIG. 3 the capacitance has been increased to 200 μf. In both cases, the oscillatory trace indicates the motor terminal volts and the thick line trace indicates the speed of rotation of the motor, the inertia of which has been increased to four times its normal value. Between A and B the motor is running at a constant speed, and at B the first braking stage is initiated. A quarter of a second later at the point indicated by C the second braking stage is initiated and the motor is brought to rest at D. Between B and C the voltage at the terminals of the motor is produced by self-excitation and is at a lower frequency than the supply voltage. Comparison of FIGS. 2 and 3 show that the larger capacitor gives lower excitation frequency, lower peak volts across the capacitor, and lower speed after the same braking time as at "C." In both cases the total stopping time is approximately ⅓ second as compared with 20 secs. when the motor is allowed to slow down without dynamic braking.

In certain applications of the invention, the braking stages may be initiated by the operation of limit switches by a member which moves relatively to the limit switches. Such an arrangement is shown diagrammatically in FIG. 4, in which limit switches are used to control the stopping position of a vehicle hauled by an induction motor by means of a rope or chain. The vehicle 10 is provided with wheels and travels along a track 11. A driving motor provided with dynamic braking in accordance with the invention is shown at 12. An idler pulley 13 is located at the end of the track remote from the driving motor. A rope 14 passes round a sleeve 15 driven by the motor 12 and the idler pulley 13, and both ends of the rope are secured to the vehicle. The direction of travel of the vehicle is determined by the direction of rotation of the driving motor. To enable the braking of the driving motor to be initiated, a pair of limit switches, located adjacent the track, are associated with each stopping position, and a member which engages with the limit switches is mounted on the vehicle. As the vehicle 10 approaches the required stopping position, the member 16 located on the vehicle 10 engages with the limit switch 17 and initiates the first stage of braking. The vehicle continues to travel towards the stopping position and subsequently member 16 engages with a further limit switch 18 which initiates the second braking stage and the vehicle is finally brought to rest. By carefully positioning the limit switches relative to the desired stopping place, it can be arranged for the vehicle to be brought to rest at the required stopping position.

What is claimed is:

1. An arrangement for applying dynamic braking to a three-phase induction motor having a stator with a three-phase primary winding on said stator, and a rotor with a secondary winding on said rotor, comprising a three-phase source of alternating current, a contactor having main and auxiliary contacts and an operating coil, said main contacts being operatively connected and arranged to connect said primary winding to said source of supply and to disconnect said primary winding therefrom, capacitor means, means comprising said auxiliary contacts for connecting said capacitor means across said primary winding when said contactor is operated to open said main contacts whereby to apply an initial stage of dynamic braking to said motor by reason of current flow through said capacitor means resulting from voltage induced in said primary winding by the continued rotation of said rotor, resistive means, means comprising further contacts for connecting said resistive means across said primary winding electrically in parallel with said capacitor means a predetermined interval of time after the application of said initial stage of dynamic braking thereby to bring said rotor to rest.

2. An arrangement for applying dynamic braking to a three-phase induction motor having a stator with a three-phase primary winding on said stator, and a rotor with a secondary winding on said rotor, comprising a three-phase source of alternating current, a contactor having main and auxiliary contacts and an operating coil, said main contacts being operatively connected and arranged to connect said primary winding to said source of supply and to disconnect said primary winding therefrom, capacitor means, means comprising said auxiliary contacts for connecting said capacitor means across said primary winding when said contactor is operated to open said main contacts whereby to apply an initial stage of dynamic braking to said motor by reason of current flow through said capacitor means resulting from voltage induced in said primary winding by the continued rotation of said rotor, resistive means, a relay having an operating winding and contacts, said winding being connected to the primary winding of the motor whereby the relay contacts are held open until the voltage developed in said primary winding has been reduced to a predetermined value by the dynamic braking effect of said capacitor means whereupon the contacts of said relay close to connect said resistive means electrically in parallel with said capacitor means to bring said rotor to rest.

3. An arrangement as claimed in claim 2, in which a full-wave rectifier is connected to the operating winding of said relay for supplying unidirectional potential thereto, the input terminals of said rectifier being connected to said motor primary winding.

4. An arrangement for applying dynamic braking to a three-phase induction motor having a stator with a three-phase primary winding on said stator, and a rotor with a secondary winding on said rotor, comprising a three-phase source of alternating current, a contactor having main and auxiliary contacts and an operating coil, said main contacts being operatively connected and arranged to connect said primary winding to said source of supply and to disconnect said primary winding therefrom, capacitor means, means comprising said auxiliary contacts for connecting said capacitor means across said primary winding when said contactor is operated to open said main contacts whereby to apply an initial stage of dynamic braking to said motor by reason of current flow through said capacitor means resulting from voltage induced in said primary winding by the continued rotation of said rotor, resistive means, a time delay relay with an operating winding and contacts and having time delay means, said operating winding being connected to the primary winding of the motor, said time delay means being arranged to hold said relay contacts open for a predetermined interval of time after the application of the initial stage of dynamic braking after which said relay contacts close to connect said resistive means electrically in parallel with said capacitor means to bring said rotor to rest.

References Cited in the file of this patent

UNITED STATES PATENTS

| 2,098,793 | Pinto | Nov. 9, 1937 |
| 2,929,977 | Choudhury | Mar. 22, 1960 |
| 3,031,605 | Whitcroft | Apr. 24, 1962 |

FOREIGN PATENTS

| 117,350 | Russia | May 3, 1957 |